United States Patent [19]

Donnell, Jr.

[11] Patent Number: 5,531,581
[45] Date of Patent: Jul. 2, 1996

[54] AJUSTABLE INJECTION MOLDING APPARATUS

[76] Inventor: Emerson B. Donnell, Jr., P.O. Box 386, Basking Ridge, N.J. 07920-0386

[21] Appl. No.: 411,192

[22] Filed: Mar. 27, 1995

[51] Int. Cl.⁶ ..................................... B29C 45/23
[52] U.S. Cl. ................. 425/145; 264/328.9; 425/146; 425/564; 425/566
[58] Field of Search ................... 425/562, 564, 425/566, 145, 146; 264/328.9

[56] References Cited

U.S. PATENT DOCUMENTS

| | | |
|---|---|---|
| 3,436,446 | 4/1969 | Angell, Jr. . |
| 3,674,401 | 7/1972 | Annis, Jr. et al. . |
| 3,746,492 | 7/1973 | De Vita . |
| 3,988,403 | 10/1976 | Angell, Jr. et al. . |
| 3,991,147 | 11/1976 | Knipp et al. . |
| 4,107,258 | 8/1978 | Angell, Jr. et al. . |
| 4,155,969 | 5/1979 | Hendry . |
| 4,173,448 | 11/1979 | Rees et al. . |
| 4,185,070 | 1/1980 | Angell, Jr. et al. . |
| 4,212,625 | 7/1980 | Shutt . |
| 4,247,515 | 1/1981 | Olabisi . |
| 4,255,368 | 3/1981 | Olabisi . |
| 4,290,744 | 9/1981 | Dannels et al. . |
| 4,781,554 | 11/1988 | Hendry . |
| 5,055,026 | 10/1991 | Gordon .................. 425/564 |
| 5,149,547 | 9/1992 | Gill ........................ 425/564 |
| 5,164,200 | 11/1992 | Johnson . |
| 5,169,648 | 12/1992 | Eckardt . |
| 5,182,118 | 1/1993 | Hehl . |
| 5,238,378 | 8/1993 | Gellert . |

Primary Examiner—Tim Heitbrink
Attorney, Agent, or Firm—Sperry, Zoda & Kane

[57] ABSTRACT

An injection molding apparatus particularly usable for low pressure structural foam molding with improved control device for providing adjustment and controlling relative positioning between the injection molding apparatus and the mold. A novel device is included for adjusting the nozzle body with respect to the injection molding apparatus and for adjusting the nozzle rod with respect to the nozzle body. An improved device is also included for facilitating adjustment of injection stroke length and of the position of the nozzle body as well as automatic adjustment of positioning of limit switches responsive to indicate the extremes of movement during the cyclical injection stroke. Automatic and manual devices are also included for maintaining alignment between the nozzle rod and the nozzle body extending therearound.

19 Claims, 4 Drawing Sheets

AJUSTABLE INJECTION MOLDING APPARATUS

BACKGROUND OF THE INVENTION

FIELD OF THE INVENTION

The present invention provides an improved construction for use in injection molding. With such apparatus, raw thermoplastic material in the form of pellets is melted and pressurized by an extruder. It is then collected within a reservoir under pressure. A mold is clamped shut by a preferably hydraulic clamp and is connected in fluid flow communication to the reservoir. The reservoir is then emptied under pressure into the mold. Once the material within the mold has solidified, preferably by water cooling of the mold or other similar means, the mold is opened and the finished product is removed therefrom.

The apparatus of the present invention is particularly usable with low pressure structural foam injection molding apparatus but can be used in any more generic injection molding apparatus. When forming structural foam in a generic injection molding machine, a valve is positioned between the mold and the accumulator and a blowing agent such as bicarbonate of soda or pure nitrogen is added to the raw material in the extruder. In most low pressure structural foam installations, multiple injectors are used to inject multiple mold cavities simultaneously to increase productivity. These multiple injectors include multiple nozzles spaced appropriately along a manifold which distributes the hot melted thermoplastic material. Each nozzle includes its own valve for injection control and its own adjustable metering valve for controlling distribution. During common injection molding the internal mold pressure is typically in the range of 10,000–30,000 lbs. per square inch. However, in low pressure structural foam molding, it is greatly reduced to approximately 200 lbs per square inch and rarely does it ever exceed a value of 1,000 lbs. per square inch. Thus, the clamping forces required to hold the mold shut are much lower and less expensive molding equipment and molds can be utilized.

The apparatus of the present invention provides multiple means for achieving infinite adjustability of the important parts within an injection molding apparatus. It is preferred in the field of injection molding apparatus design to have the maximum capability and convenience of adjustment to allow for variations in products being produced, in the various types of molds utilized, in the different types of thermoplastic material used and in other variables in the process. The present invention provides several novel means for providing universal adjustability, both at set-up and while in full production operation.

In all forms of injection molding the positioning of the nozzle body and nozzle rod relative to the nozzle seat in the mold has been determined to be quite critical. Also, the nozzle seat depth which is the depth of penetration of the nozzle body into the mold is particularly important. If the fit between the nozzle body and nozzle seat is too loose then leakage will occur. On the other hand, if the fit is too tight then damage to the nozzle seat in the mold can occur. Even between these two opposite extremes in fit, system operating parameters can vary significantly.

A slightly tighter fit between the nozzle body and the nozzle seat will cause the tip to run cooler since heat transfer from the hot nozzle to the water cooled mold will be increased. Cooler operating temperatures can cause sticking of plastic to the tips, sometimes solidified enough to pull a piece of a plastic out of the molded part which may leave a scar therein. Cooler operating temperatures also generally required greater force for causing rod movement possibly exceeding the parameter of system design. However, a looser fit will result in the nozzle tip operating at a somewhat warmer temperature which can cause plastic to remain molten and stick to the tips created unwanted strings during withdrawal of the molded part from the mold.

Thus, the present invention provides a uniquely important design for an injection molding apparatus wherein improved means are provided for adjusting and maintaining adjustment of the nozzle body and nozzle tip with respect to the mold and with respect to each other along with controlling the limits of injection stroke movement.

DESCRIPTION OF THE PRIOR ART

Numerous prior art designs have been utilized for molding of foamed thermoplastic articles or other injection molding systems and apparatus such as shown in U.S. Pat. No. 3,436,446 issued Apr. 1, 1969 to R. Angell, Jr. and assigned to Union Carbide Corporation on a "Molding Of Foamed Thermoplastic Articles"; and U.S. Pat. No. 3,674,401 issued Jul. 4, 1972 to R. Annis, Jr. et al and assigned to USM Corporation on an "Apparatus For Injection Molding Articles Of Foam Material; and U.S. Pat. No. 3,746,492 issued Jul. 17, 1973 and assigned to Structural Foam Products, Inc. on an "Apparatus For Molding Foamed Thermoplastic Articles"; and U.S. Pat. No. 3,988,403 issued Oct. 26, 1976 to R. Angell, Jr. et al and assigned to Union Carbide Corporation on a "Process For Producing Molded Structural Foam Article Having A Surface That Reproducibly And Faithfully Replicates The Surface Of The Mold"; and U.S. Pat. No. 3,991,147 issued Nov. 9, 1976 to U. Knipp et al and assigned to Bayer Aktiengesellschaft on a "Process For Molding Foamed Plastics From Reaction Mixtures Involving Closed Mold Filling With The Avoidance of Gas Bubble Entrainment"; and U.S. Pat. No. 4,107,258 issued Aug. 15, 1978 to R. Angell, jr. et al and assigned to Union Carbide Corporation on an "Injection Molding Reduced Combustibility High Impact Strength Polyethylene Articles"; and U.S. Pat. No. 4,155,969 issued May 22, 1979 to J. Hendry and assigned to Ex-Cell-O Corporation on a "Method For Injection Foam Molding"; and U.S. Pat. No. 4,173,448 issued Nov. 6, 1979 to H. Rees et al and assigned to Husky Injection Molding Systems on an "Actuating Mechanism For Gate Valve Of Injection Nozzle"; and U.S. Pat. No. 4,185,070 issued Jan. 22, 1980 to R. Angell, Jr. et al and assigned to Union Carbide Corporation on a "Process For Injection Molding Thermoplastic Articles With Reduced Combustability"; and U.S. Pat. No. 4,212,625 issued Jul. 15, 1980 to G. Shutt on a "High Speed Injector For Molding Machines"; and U.S. Pat. No. 4,247,515 issued Jan. 27, 1981 to O. Olabisi and assigned to Union Carbide Corporation on a "Process For Molding Of Plastic Structural Web Articles"; and U.S. Pat. No. 4,255,368 issued Mar. 10, 1981 to O. Olabisi and assigned to Union Carbide Corporation on a "Structural Foam Molding Process"; and U.S. Pat. No. 4,290,744 issued Sep. 22, 1981 to W. Dannels et al and assigned to Hooker Chemicals & Plastics Corp. on an "Apparatus For Runnerless Injection-Compression Molding Thermosetting Materials"; and U.S. Pat. No. 4,781,554 issued Nov. 1, 1988 to J. Hendry and assigned to Michael Ladney on an "Apparatus For The Injection Molding Of Thermoplastics"; and U.S. Pat. No. 5,164,200 issued Nov.

17, 1992 to T. Johnson and assigned to Nitrojection Corporation on a "Nozzle For Gas Assisted Injection Molding"; and U.S. Pat. No. 5,169,648 issued Dec. 8, 1992 to H. Eckardt et al and assigned to Battenfeld GmbH on an "Apparatus For Injection Molding Articles Of Thermoplastic Materials"; and U.S. Pat. No. 5,182,118 patented Jan. 26, 1993 to K. Hehl on a "Plasticizing Apparatus For Use In An Injection Molding Machine"; and U.S. Pat. No. 5,238,378 issued Aug. 24, 1993 to J. Gellert on a "Coinjection Molding Apparatus Having Rotary Axial Actuating Mechanism".

SUMMARY OF THE INVENTION

The present invention provides an improved adjustable injection molding apparatus usable for forming of many different types of products within an injection mold for melted thermoplastic material. The design includes a frame with a hydraulic cylinder preferably integrally formed therewith. The cylinder defines a cylinder bore extending therethrough with a first end opening adjacent one end of the bore and a second end opening adjacent the other end of the bore. A cylinder rod is included movably extending within the cylinder and extending out of both ends of the cylinder bore. The cylinder rod includes a bumper member positioned thereon outside of the cylinder bore on the side of the first end opening thereof. This bumper member facilitates abutment of the cylinder rod thereabove during the injection cycle.

A nozzle rod is included attached to the cylinder rod and extending outwardly therefrom and movable therewith. Preferably this nozzle rod is secured with respect to the cylinder rod by a coupling member such as a poppet extending therearound. This poppet member also cooperates with a poppet seat to provide a valve for minimizing the leakage of heated fluid thermoplastic material during the part of the molding cycle when internal fluid pressure is high.

A nozzle body is attached to the frame in an adjustable manner. This nozzle body defines a nozzle channel extending therethrough which allows the dispensing of melted thermoplastic material therealong. This nozzle body further defines a tip opening at the extreme outermost end thereof which is configured in fluid flow communication with respect to the nozzle channel in such a manner as to further facilitate dispensing of melted thermoplastic material therethrough. The configuration of the nozzle rod positions it movably within the nozzle channel for controlling dispensing therealong. This nozzle rod is also selectively positionable in the tip opening of the nozzle body for closing thereof whenever the injection cycle has been completed.

A piston is fixedly secured to the cylinder rod at a position within the cylinder bore. This piston is reciprocally movable within the cylinder bore between a position adjacent the first end opening with the nozzle rod thereby being open with respect to the tip opening and a second position adjacent the second end opening with the nozzle rod closed by extending into the tip opening.

The nozzle body and nozzle rod are adjustable with respect to the mold for many reasons including controlling of heat transfer between the watercooled mold and the injection tip. The mold defines a mold bore therein with a nozzle seat positioned therein. The nozzle body is adapted to extend into the mold bore into a position in abutment with the nozzle seat to supply molten plastic material into the mold for forming of the molded part therein. The mold itself is formed of a cavity half member and a core half member separated by a parting line and movable with respect to one another between a closed position for injection and part forming and an opened position to allow removal of the formed part.

A housing is preferably included in the design of the present invention which is fixedly secured to the frame and defines a housing bore extending therethrough. A block member is movably mounted within the housing bore and defines an adjustment bore extending therethrough. A compression spring is preferably positioned within the housing bore between the block and the housing and is operative to urge the block away from the housing such that it will be forced in a direction to exit the housing bore.

An adjustment shaft is preferably positioned extending through the adjustment bore and is preferably in threaded engagement with the block member. This adjustment shaft is adjustably movable with respect to the block member to vary the relative positioning between the adjustment shaft and the block. A first limit switch is preferably fixedly secured to the frame at a position adjacent the housing. A limit switch is defined herein to be any type of generic switch which is operable to be actuated responsive to movement of a mechanical member to its most extreme position in a given direction. The limit switch can actually be any type of generic position sensing device.

The first limit switch is designed to be activated to indicate movement of the nozzle rod to the extreme fully opening position with respect to the tip opening. A first flag arm is attached to the block and is movable therewith. This first flag arm is adapted to be moved along with the block to a position adjacent the first limit switch for tripping thereof responsive to movement of the nozzle rod to the fully opened position out of engagement with the tip opening.

A second limit switch is fixedly secured to the frame at a position adjacent the bumper. This second limit switch is adapted to be activated to indicate movement of the nozzle rod to the fully closed position with respect to the tip opening. A second flag arm is attached to the cylinder rod adjacent the bumper to be movable therewith. This second flag arm is movable with the cylinder rod to a position adjacent the second limit switch for tripping thereof responsive to movement of the nozzle rod to the fully closed position relative to the tip opening.

A stop head may also be included spatially positioned on the adjustment shaft at a distance from the bumper of the cylinder rod. This stop head is adapted to be contacted by the bumper of the cylinder rod responsive to movement of the nozzle rod in the direction toward the open position to urge the block to move deeper within the housing. In this manner the compression spring means will be compressed allowing the first flag arm to move upwardly as shown in FIG. 1 to activate the first limit switch to indicate that the nozzle rod is in the fully opened position. Preferably the first flag arm will extend through an alignment slot extending parallel to the direction of the adjustment shaft and defined within the housing. This alignment slot will allow the first flag arm to extend outwardly for abutment with respect to the first limit switch responsive to movement of the nozzle rod while in its extreme open position while at the same time will maintain axial alignment between the block and the housing.

In an alternative configuration of the design of the present invention the nozzle body which is attached to the frame will be adjustably secured thereto. This nozzle body will preferably define a nozzle channel extending therethrough in a conventional manner. However, the nozzle body will be movably mounted within a nozzle flange which is fixedly secured to a manifold. The manifold is fixedly secured to the frame and defines a manifold channel extending therethrough for conveying and distributing of melted thermoplastic material therealong. The nozzle flange itself is then fixedly secured to the manifold and defines a flange channel therein in fluid flow communication with respect to the manifold channel to receive the melted thermoplastic material therefrom. The nozzle body in turn is movably secured with respect to the nozzle flange and preferably is in threading engagement therewith to allow adjustment therebetween by rotation of the nozzle body within the nozzle flange. In this manner adjustment of the length of the nozzle body with respect to the injection apparatus and, in particular, the nozzle flange is achievable as required in various processes in the production of different types of product. The apparatus of the present invention may further include a nozzle body configuration including a first nozzle body member adjustably secured to the nozzle flange and extending outwardly therefrom as well as a second nozzle body member detachably affixed to the first nozzle body and extending further outwardly therefrom to a position therebelow defining the tip opening. A locking device may be included positioned at the intersection between the first and second nozzle body members for affixing them with respect to one another and allowing this two part nozzle body configuration to be adjustable similarly to that method described immediately hereabove.

This locking means can include an overlapping rim defined on the second nozzle body member which extends around the first nozzle body member and overlapping thereover. The overlapping rim may define an angular slot therein. A locking jaw is movably positioned within this angular slot and is engageable by a locking screw which extends through the rim of the second body member and is engageable with the locking jaw to urge movement thereof within the angular slot for selectively securing the first nozzle member to the second nozzle member by wedging engagement therebetween. A containment screw can also be utilized for holding the locking screw in place.

In another alternative configuration the nozzle rod includes two separate nozzle rod members referred to as the first nozzle rod member and the second nozzle rod member. The first nozzle rod member extends from the coupling or poppet into the nozzle channel to an intermediate position therein. The second nozzle rod member preferably is threaded to the first nozzle rod member and extends therefrom along the nozzle channel to a position adjacent the tip opening for selectively closing thereof. The second nozzle rod member is preferably longitudinally adjustably movable with respect to the first nozzle rod member responsive to relative rotational movement therebetween to vary the overall length of the entire nozzle rod configuration. The adjustment of the nozzle rod length can be made automatic by the formation of the second nozzle rod member with an enlarged section having one or more keyways defined longitudinally therein. With this configuration a key such as a key screw or the like extends through the nozzle body into the nozzle channel adjacent the second nozzle rod member into engagement with one of the keyways. This key means is operative to cause rotational movement of the second nozzle rod member with respect to the first nozzle rod member responsive to rotational movement of the nozzle body with respect to the nozzle flange as described above to maintain relative adjustment positioning the second nozzle rod member and the tip opening.

As described above, the coupling or poppet is designed for interconnecting of the cylinder rod with respect to the nozzle rod. The poppet, however, also preferably includes an angular surface therein which is engageable with respect to a poppet seat defined in the manifold. The abutment of the poppet with respect to the poppet seat always defines the closed position of the nozzle rod with respect to the tip opening. If it is desired that the position of the nozzle rod be modified then the relative position between the nozzle rod and the poppet must be modified thereby changing the position of the nozzle rod with respect to the nozzle body in the closed position with the poppet in abutment with the poppet seat. A manual adjustment device is included with the present invention for controlling relative movement between the poppet and the nozzle rod. This design includes a sleeve secured to the cylinder rod with the nozzle rod attached thereto for linking of the cylinder rod with respect to the nozzle rod. The sleeve includes a sleeve bore extending axially therethrough to allow the nozzle rod to extend freely therethrough.

An extension stud is also included which defines an extension stud bore therethrough for receiving the nozzle rod movably positioned therethrough. This extension stud preferably includes a first stud member extending into the sleeve bore of the sleeve and being movably adjustably secured therewithin. A stud shaft is included fixedly formed with the first stud member. A second stud member is also included extending outwardly from the stud shaft oppositely from the first stud member in such a manner as to be secured to the poppet. A split shaft collar is also preferably included extending around the poppet and the second stud and being adapted to compress the poppet for controlling attachment therebetween.

A stud locking device is positioned around the first stud member and is selectively in abutment with respect to the extension stud and the sleeve. With this configuration a stud locking nut can be positioned on the first stud member to be tightened in abutment with respect to the sleeve for locking the adjusted position between the first stud member and the sleeve. When adjustment is required the locking nut can be loosened allowing the first stud shaft of the extension stud to be grasped and rotated to rotate the first stud member within the threaded sleeve bore. In this manner the relative positioning between the sleeve and the extension stud can be adjusted as desired thereby equally increasing or decreasing the distance between the nozzle rod end and the poppet for controlling the position of the nozzle rod with respect to the nozzle body and the tip opening defined therein. Once this adjustment is achieved the stud locking nut can be again secured in abutment with the sleeve to fix the sleeve with respect to the extension stud and maintain the desired adjustment therebetween.

It is an object of the present invention to provide an improved adjustable injection molding apparatus for forming products within a mold from melted thermoplastic material wherein accurate relative adjustment is provided in positioning of the injection nozzle tip with respect to the nozzle seat in the mold bore.

It is an object of the present invention to provide an improved adjustable injection molding apparatus for forming products within a mold from melted thermoplastic material wherein control of thermal flow between the nozzle body and rod and the watercooled mold is achieved.

It is an object of the present invention to provide an improved adjustable injection molding apparatus for forming products within a mold from melted thermoplastic material wherein the initial capital cost of equipment is minimized.

It is an object of the present invention to provide an improved adjustable injection molding apparatus for forming products within a mold from melted thermoplastic material wherein the possibilities of adjustment of parts with respect to one another are maximized.

It is an object of the present invention to provide an improved adjustable injection molding apparatus for forming products within a mold from melted thermoplastic material wherein adjustment can be achieved without removing of the injection apparatus from the mold under certain circumstances.

It is an object of the present invention to provide an improved adjustable injection molding apparatus for forming products within a mold from melted thermoplastic material wherein a more efficient injection molding apparatus is achieved.

It is an object of the present invention to provide an improved adjustable injection molding apparatus for forming products within a mold from melted thermoplastic material wherein down time is minimized.

It is an object of the present invention to provide an improved adjustable injection molding apparatus for forming products within a mold from melted thermoplastic material wherein use with different types of melted thermoplastic material is possible.

It is an object of the present invention to provide an improved adjustable injection molding apparatus for forming products within a mold from melted thermoplastic material wherein utility of low pressure injection molding apparatus is enhanced.

It is an object of the present invention to provide an improved adjustable injection molding apparatus for forming products within a mold from melted thermoplastic material wherein use with low pressure structural foam processes is particularly enhanced.

It is an object of the present invention to provide an improved adjustable injection molding apparatus for forming products within a mold from melted thermoplastic material wherein multiple successive injections can be performed with remarkable regularity.

It is an object of the present invention to provide an improved adjustable injection molding apparatus for forming products within a mold from melted thermoplastic material wherein mismatches between the nozzle rod and the nozzle body can be minimized.

It is an object of the present invention to provide an improved adjustable injection molding apparatus for forming products within a mold from melted thermoplastic material wherein leakage of the melted thermoplastic material is minimized.

It is an object of the present invention to provide an improved adjustable injection molding apparatus for forming products within a mold from melted thermoplastic material wherein adjustment of the nozzle body with respect to the manifold is possible without removing of the nozzle body from its position inserted into the mold.

It is an object of the present invention to provide an improved adjustable injection molding apparatus for forming products within a mold from melted thermoplastic material wherein adjustment of limit switches is no longer necessary after adjustment of the nozzle rod or nozzle housing thereof.

It is an object of the present invention to provide an improved adjustable injection molding apparatus for forming products within a mold from melted thermoplastic material wherein automatic adjusting of the length of the nozzle rod can be achieved responsive to adjusting of the nozzle body with respect to a main apparatus.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
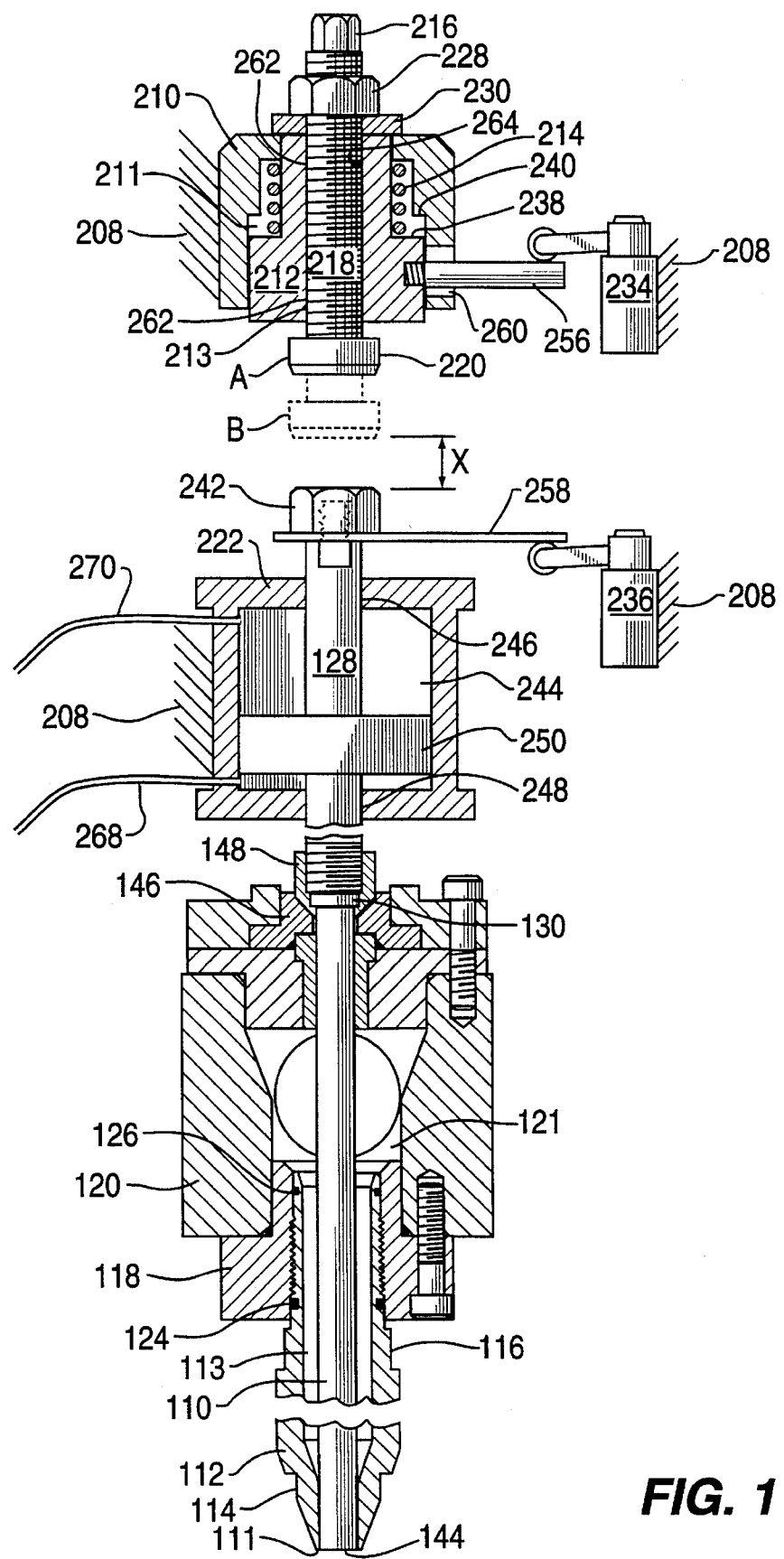
FIG. 1 is a partially schematic and partially cross-sectional view of an embodiment of the improved injection molding apparatus of the present invention.

The present invention provides a frame 208 schematically represented in the drawings herein as hatched areas as shown best in FIG. 1. The frame comprises the fixed structure of the present apparatus and can include certain immovable elements such as the cylinder housing 222. A housing 210 is fixedly secured to frame 208 to remain stationary therewith. Housing 210 defines a housing bore means 211 extending therethrough usually but not necessarily in a vertical direction. Housing bore means 211 is adapted to receive a block member 212 slidably mounted therein. A block biasing means such as a compression spring 214 is positioned within said housing bore 211 in a position between the housing 210 and the block member 212 in order to exert a force on block member 212 to urge it to move away from housing 210.

Block member 212 defines an adjustment bore means 213 extending therethrough which preferably includes housing female thread means 262. An adjustment shaft 218 is positioned extending through the adjustment bore 213 of block member 212. Preferably the adjustment shaft 218 includes shaft male thread means 264 thereon mated with housing female thread means 262 of the threaded adjustment bore 213 extending through block means 212 to facilitate adjustment therebetween. The female threads of bore 213 are mated to the male threads defined on the threaded adjustment shaft 218 for adjustable engagement therebetween. An adjustment head 216 in the form of a fixed hex head or other easily gripped and rotated member is fixedly secured on the upper end of the adjustment shaft 218 or, preferably, is integral therewith to facilitate adjustment of adjustment shaft 218 by rotation thereof. An adjustment shaft locking nut 228 may be threaded onto adjustment shaft 218 for locking thereof by tightening with respect to the block 212 after adjustment thereof. A washer means such as washer 230 can also be positioned between the locking nut 228 and said housing 210 to prevent block 212 from leaving engagement with housing 210.

The adjustment shaft 218 extends through adjustment bore 213 to a position below the block means 212 and terminates in a stop head 220 preferably integral with shaft 218. Stop head 220 is preferably movable with respect to the block member 212 responsive to rotation of the adjustment head 216 and shaft 218 to adjust the relative distance therebetween. Also after adjustment, stop head 220 is then only movable along with block member 212.

Cylinder 222 is fixedly mounted with respect to frame 208 to prevent movement thereof. Preferably cylinder 222 is integrally formed with respect to frame 208. Cylinder 222 is preferably configured as a double ended cylinder defining a cylinder bore 244 with a first end opening means 246 and a second end opening means 248. A cylinder rod 128 is movably mounted within the cylinder means 222 and extends outwardly through both the first end opening means 246 and the second end opening means 248. A piston means 250 is fixedly secured to the cylinder rod 128 within the cylinder bore 244 and is mechanically captured therein. The fixedly interconnected assembly formed by the cylinder rod 128 and the piston member 250 are thereby reciprocally movable throughout a stroke distance initially limited by the length of movement possible by the piston member 250 within cylinder bore 244 between the first end opening means 246 and the second end opening means 248.

A first hydraulic fluid line 268 is in fluid flow communication with the cylinder means 222 between the piston member 250 and the second end opening means 248 for supplying of hydraulic powering fluid therewithin to urge piston 250 away from the second end opening means 248 and toward the first end opening means 246. In a similar but opposite configuration, a second hydraulic fluid line 270 is in fluid flow communication with the cylinder means 222 between the piston member 250 and the first end opening means 246 for supplying of hydraulic powering fluid therewithin to urge piston 250 away from the first end opening means 246 and toward the second end opening means 248. In this manner alternating flow of hydraulic powering fluid through lines 268 and 270 will cause reciprocating movement the injection apparatus of the present invention.

The upper end of the cylinder rod 128 preferably includes a bumper member 242. In FIG. 1 this bumper member 242 is shown in the form of a large nut with a flat upwardly facing surface fixedly secured to the uppermost end of cylinder rod 128. Bumper 242 is preferably positioned spatially distant from the stop head 220 of adjustment shaft 218. The distance between bumper 242 and stop head 220 is shown as "X" in FIG. 1. The figure also shows the nozzle rod 110 secured to the cylinder rod 128 by a poppet 148 and extending away therefrom to a position within a nozzle body 112 therebelow.

Poppet 148 provides a convenient means for securing of the cylinder rod 128 with respect to the nozzle rod 110. A poppet seat means 146 is positioned within a portion of frame 208 which is positioned adjacent the manifold 120 and is engageable with poppet 148 to prevent or allow material flow thereby during that engagement, and in this manner, functions as a seal to control leakage around rod 110 for a major portion of the molding cycle. Poppet 148 is preferably movable along with rods 128 and 110 during movement through an injection stroke cycle to move into abutment with respect to the poppet seat 146. This stroke is designed such that once the above abutment is achieved then the movement of nozzle rod 110 toward the mold 196 is completed. Abutment between poppet 148 and poppet seat 146 indicates that the stroke in the downward direction as shown in FIG. 1 has been completed and matching between the outermost nozzle rod tip 144 and the tip opening 111 must be achieved. If a mismatch results at this point in the stroke then one of the means of adjustment in the present invention must be utilized to correct the mismatch.

Nozzle body 112 is designed to be positioned extending into the mold bore 274 defined in the mold 196. Mold bore 274 extends within mold 196 into the mold cavity therein defined between the cavity mold half 282 and the core mold half 284 to allow supplying of melted plastic material therebetween to form the desired part. Halves 282 and 284 are separated by a parting line 280 such that they are movable with respect to one another to allow removal of the injection molded part 278. This mold bore 274 includes a nozzle seat 276 therein against which the tapered outer end of the nozzle body 112 will abut. The tightness of the fit between body 112 and nozzle seat 276 is critical in controlling thermal flow therebetween.

It is also an important characteristic of an injection molding apparatus of the present invention that the distance of an injection stroke be carefully and accurately controlled, monitored and easily adjusted. Monitoring when the cylinder rod 128 reaches the end of a downward stroke is achieved in the design of the present invention by the inclusion of a second limit switch 236. Switch 236 is preferably fixedly secured with respect to frame 208. A second flag arm 258 is preferably fixedly attached to the bumper 242 and is positioned to contact the second limit switch 236 responsive to the cylinder rod 128 reaching the lowermost extent of its' stroke.

In a similar manner, a first limit switch 234 is fixedly secured to the apparatus frame 208 in a location adjacent to housing 210. A first flag arm 256 is secured to the block member 212 to be vertically movable therewith and extend outwardly therefrom in such a manner as to be adapted to trip first limit switch 234 responsive to the cylinder rod 128 reaching the uppermost end of a given injection stroke responsive to block 212 and first flag arm 256 reaching the uppermost extent of their movement. Limit switches 234 and 236 can be any type of generic position sensing device. The general purpose of these sensing devices within the apparatus of the present invention is to detect specific mechanical movement to the extreme position in a given direction, as such, any type of position sensing device is usable for this purpose.

In the preferred configuration shown in the FIG. 1, the first flag arm 256 is affixed to the side area of block member 212 and extends laterally outwardly therefrom through an alignment slot 260 defined in the side of housing 210 to a position adjacent the first limit switch 234 for tripping thereof responsive to movement of the cylinder rod 128 to the uppermost end of an injection stroke. Alignment slot means 260 preferably is oriented extending longitudinally in a direction parallel to said adjustment shaft 218. With this construction, the first flag arm 256 will also be operative to maintain the relative rotational orientation between the housing 210 and the block member 212 since arm 256 extends through the alignment slot 260. First flag arm 256 will effectively prevent rotation of block member 212 within housing 210.

In operation whenever cylinder rod 128 is at the lower end of the injection stroke, the second flag arm 258 will trip second limit switch 236 creating the required monitoring signal to be emitted therefrom and thereafter will allow the initiation of reverse movement by cylinder rod 128. As cylinder rod 128 initiates this upward movement, the bumper 242 will also move toward stop head 220 as shown in FIG. 1 through distance X. As bumper 242 moves in this direction, it will contact the head 220 of adjustment shaft 218. Continued movement of cylinder rod 128 in the same direction will cause movement of adjustment shaft 218, block 212 and first flag arm 256 also in the same direction. Block 212 will compress spring biasing means 214.

Block 212 will preferably include a block shoulder 238 and housing 210 will preferably include a housing shoulder 240. Shoulders 238 and 240 should be spaced apart by a distance designated as "Y" which is preferably approximately 0.5 inches. As the upward portion of the injection stroke causes block 212 to move upwardly, the moving block shoulder 238 will move toward the stationary housing shoulder 240 until abutment therewith. At the point where shoulders 238 and 240 contact, the uppermost point on the nozzle rod stroke has been reached. At this point the first flag arm 256 will be positioned to trip the first limit switch 234 thereby generating the required monitoring signal signifying the uppermost position within the cycle. At the appropriate time thereafter, cylinder rod 128 will start to move downwardly as shown in FIG. 1 and eventually reaching the point where stop head 220 returns to its lowermost position. Thereafter bumper 242 will no longer be in abutment with stop head 220 and will continue to move downwardly through distance X until second flag arm means 258 again trips second limit switch 236 to indicate that cylinder rod 128 is again at the lowermost point in the injection stroke.

With this configuration for controlling the length of the injection stroke and monitoring the extreme positions of the stroke, the apparatus of the present invention eliminates the need for repetitive re-adjustment of the position of the first limit switch 234 each time the stroke length is changed as is required in the injection molding systems of the prior art.

The injection stroke of the present invention is divided into two linearly measurable components, namely X and Y. The total stroke is always the sum of dimensions X and Y. X is always the last portion of the stroke, approximately 0.5 inches, where the block 212 moves upwardly with respect to the housing 210. X is always the initial portion of the stroke. Adjustment of the stroke length is accomplished by selectively adjusting of the X portion of the total stroke.

Stroke adjustment is achieved by rotation of adjustment head 216 which causes adjustment shaft 218 to rotate within block 212 thus changing the relative position between block 212 and stop head 220 and therefor between stop head 220 and bumper 242 which is the distance, X. Position "A" illustrates stop head 220 at an upper adjusted position for a longer X dimension and a longer total stroke. Position "B" illustrated in dotted outline in FIG. 1 shows stop head 220 at a lower adjusted position for a shorter X dimension and a shorter total stroke. Regardless of whether the longer or shorter stroke position is currently in use, the last increment or approximately ½" of the stroke will be achieved by the upward relative movement of block 212 with respect to housing 210 and the corresponding tripping of first limit switch 234 by first flag arm 256. Thus, we see that the length of the injection stroke can be changed without requiring any changes in the actual positions of the first and second limit switches 234 and 236.

The injection molding apparatus of the present invention as shown in the lower portion of FIG. 1 includes a nozzle rod 110 extending longitudinally and being movable axially while positioned within a nozzle body 112. Nozzle rod 110 is movable with respect to the nozzle body 112 for closing of the tip opening means 111, defined in the lowermost end of nozzle body 112, when the nozzle rod 110 is in the lowermost position. Nozzle rod 110 is movable to open the tip opening means 111 when moved upwardly within nozzle body 112 to allow material from nozzle channel means 113 to exit through tip opening means 111. Nozzle channel means 113 is in fluid flow communication with respect to the manifold channel means 121 defined within the manifold 120 fixedly secured to the frame means 208 of the present invention. As such melted material is provided through the manifold channel means 121 and on into the nozzle channel means 113. Tip opening means is in fluid flow communication with respect to the manifold channel means 121 to allow melted material therein to be dispensed therefrom into the mold 196 thereadjacent for forming of the desired product. However, with the outermost nozzle rod tip 144 positioned within the tip opening means, it is closed to fluid flow therethrough. However, when an injection stroke is initiate by supplying of hydraulic fluid through first hydraulic line 268, the piston 250, and cylinder rod 128 and nozzle rod 110 will start to move upwardly as shown in FIG. 1 causing material from said nozzle channel means 113 to start to exit through tip opening means 111 into the mold 196 threadjacent.

Heretofore, the injection molding apparatus has used a one-piece unit including a mounting flange and an integral nozzle body formed therewith. A separate nozzle body tip section is attached to the integral nozzle body immediately adjacent the injection tip area thereof. Adjustment was provided to a limited extent by the threaded connection between the nozzle body tip section and the integral nozzle body portion of the mounting flange. Adjustment was also only possible by removal of the injection nozzle rod and body from the mold 196 thereby greatly increasing time and cost for making such adjustments.

However, the present invention provides the novel configuration for forming the nozzle body 112 as a single integral or fixed member extending from the separate nozzle flange 118 completely to the lowermost end of the nozzle body 112. With this configuration, the nozzle body 112 is adapted to be threaded into the nozzle flange 118 which is fixedly secured to manifold 120. The threaded joint between nozzle body 112 and nozzle flange 118 provides a means for adjustment of the length of the nozzle body 112 from the frame means 208. This threaded joint results from mated and threaded connection between the nozzle body thread means 198 defined on the exterior of nozzle body 112 and the flange body thread means 200 located within the aperture defined in nozzle flange 118. This adjustment capability also provides a reason for a possible mismatch of the relative position of the nozzle body injection aperture 111 which is desired to be properly positioned evenly with respect to the outermost tip 144 of the nozzle rod 110. That is, this adjustment often creates a mismatch in positioning between the lowermost end of nozzle rod 110 with respect to the tip opening 111.

The nozzle flange 118 extends into the manifold 120 and has a central opening extending therethrough in fluid flow communication with respect to a manifold channel 121 defined within manifold 120 to receive melted plasticized material therefrom. Melted plasticized material can be provided for injection through manifold channel 121 and then downwardly within nozzle body 112 in nozzle channel means 113. With rod 112 in the upper portion of the stroke this material can flow therepast to be injected outwardly through the nozzle body injection aperture 111.

An O-ring 124 can be positioned between the nozzle body 112 and the nozzle flange 118 to prevent leakage of plasticized material thereby. In a similar manner, an O-ring configuration 126 can be positioned between the nozzle flange 118 and the manifold 120 to prevent leakage of plasticized material thereby.

With this single integral configuration for the nozzle body 112 extending completely from the nozzle flange 118 to the lowermost tip 144 of the nozzle body 112, the depth of penetration of the nozzle body 112 when extending into a mold 196 positioned therebelow, can be accurately controlled. This control is achieved by the threaded interconnection between the unitary nozzle body 112 and the nozzle flange 118. Turning in either direction can vary the position of the nozzle body 112 relative thereto. To facilitate this adjustment of nozzle body 112, a hex flat 114 can be configured on the lowermost portion of nozzle body 112. This hex flat 114 will be positioned on the external surface and will facilitate grasping thereof by a wrench or other tool during set-up before mold 196 is in place. In a similar manner, a hex flat 116 can be positioned on the external surface of the nozzle body 112 in an area immediately adjacent the nozzle flange 118 to facilitate adjustment of relative positioning of nozzle body 112 with respect to the nozzle flange 118 when access to hex flat 114 is not possible such as when the nozzle body 112 is in place within a mold 196 ready for injection.

Figure 2:
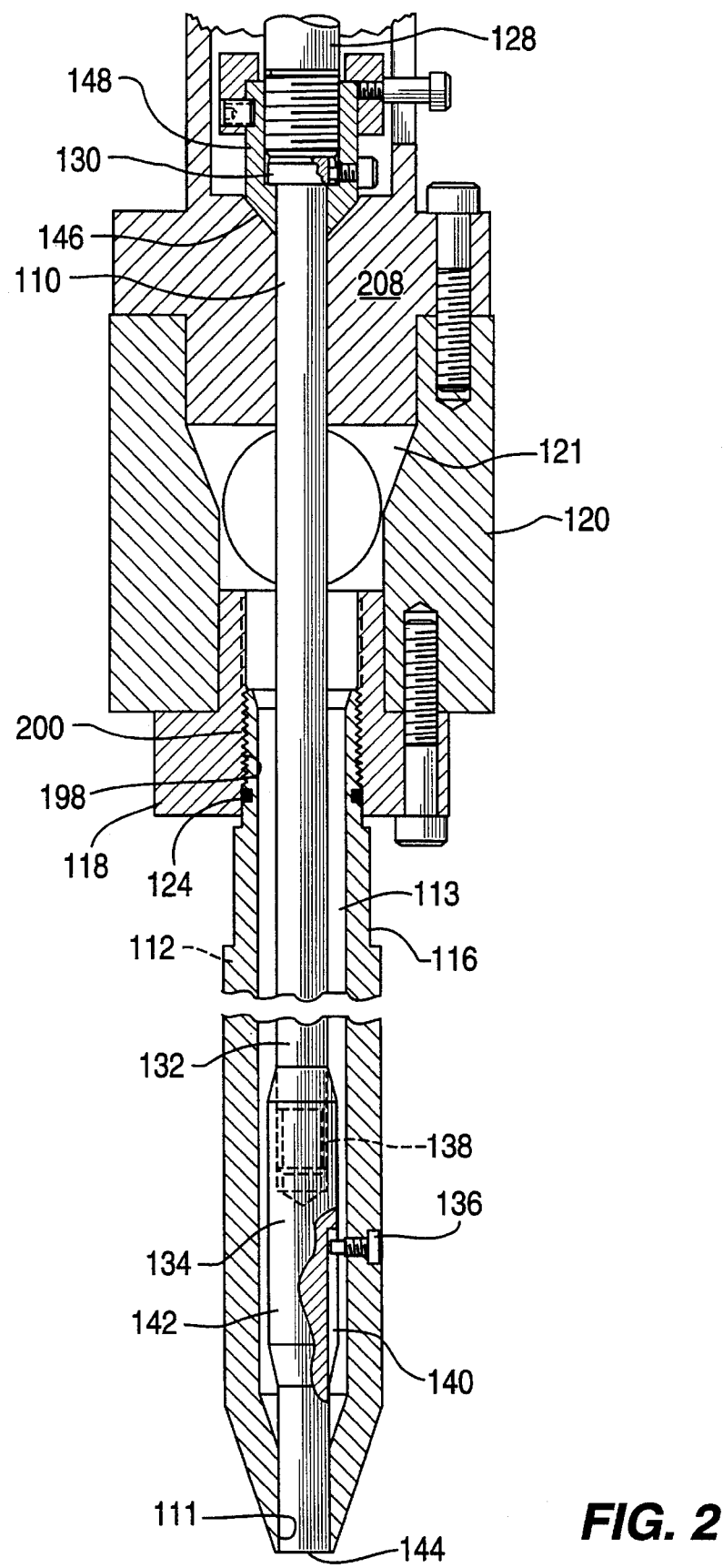
FIG. 2 is a cross-sectional view of an alternative embodiment of the apparatus of the present invention including apparatus for automatically adjusting the length of the nozzle rod responsive to adjustment of the nozzle body length.

In FIG. 2, a similar configuration is disclosed, however, utilizing an automatic adjustment apparatus in association with the nozzle body adjustment means. As shown in this figure, the nozzle rod 110 can include a first nozzle rod member 132 and an second nozzle rod member 134 which are connected with respect to one another by a threaded interconnection 138. Connection 138 allows the second nozzle rod member 134 to be rotated such that the position thereof can be varied and the overall length of the combined nozzle rod assembly 110 adjusted as desired. This capability is achieved by positioning of a key means 136, such as a screw or similar part, extending through the nozzle body 112 into engagement with a keyway means 140 defined in the outer surface of the second nozzle rod section 134. Preferably the second nozzle rod section 134 will include an enlarged section 142 which defines one or more keyways 140. With this configuration key means 136 will extend into one of the keyways 140 such that rotation of the nozzle body 112 to adjust the length of nozzle body 112 with respect to the frame 208 of the injector apparatus will simultaneously and equally adjust the length of the nozzle rod 110. This is true because if the hex shaped flat 116 or 114 is grasped by a tool for rotation of the nozzle body 112, the key screw 136 which is in engagement with keyway 140 will cause a similar rotation in the enlarged section 142 and the entire second nozzle rod member 134. As long as the same lead is chosen in the threaded engagement means between the nozzle body 112 and the nozzle flange 118 as is present in the threaded connection means 138 between the first and second rod sections 132 and 134, then similar adjustment will occur, and the outermost tip 144 of the nozzle rod 110 will remain in the same relative position to the nozzle body 112 and tip opening 111 whenever the length of the nozzle body 112 is adjusted by rotation thereof. In this manner, the chosen relationship between the position of the nozzle rod 110 and the nozzle body 112 will automatically be maintained despite changes in the length of nozzle body 112 performed externally. In this manner, mismatches will be prevented.

Figure 3:
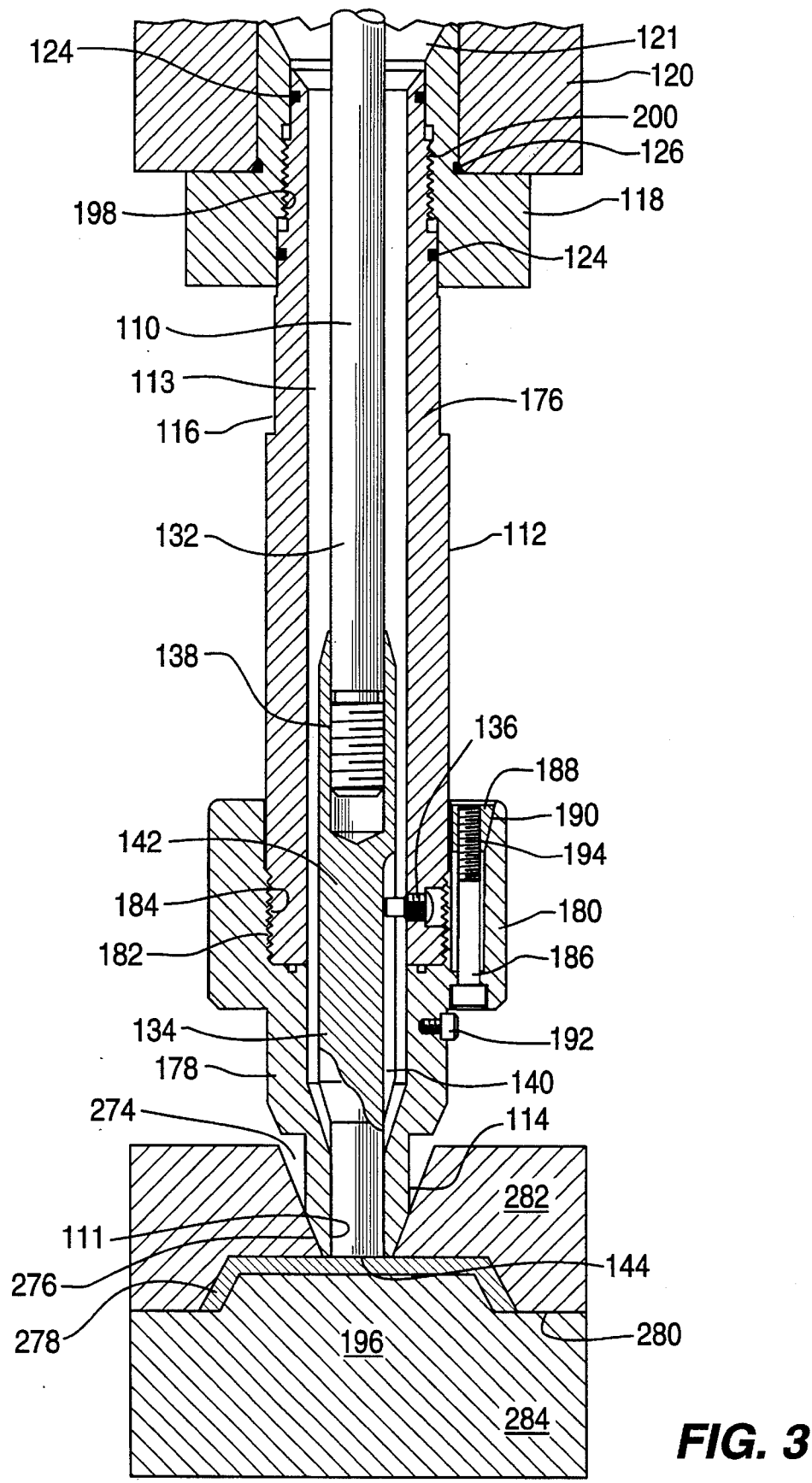
FIG. 3 is a cross-sectional view of an alternative embodiment of the nozzle body configuration showing a two-piece nozzle body configuration.

The concept of one integral nozzle body 112 can also be achieved by a configuration of two piece nozzle body as shown in FIG. 3. In this configuration nozzle body 112 includes a first nozzle body section or member 176 threaded into the nozzle flange 118. A separate second nozzle body member or section 178 is connected to first nozzle body section 176 extending outwardly therefrom to form the entire nozzle body configuration. The second nozzle body member 178 defines the tip opening 111. This two piece configuration is adjustable similarly to the one piece integral design described above by being adjustably secured into the nozzle flange 118. This two piece nozzle body is adjustable like the one piece unit because it includes a separate locking mechanism 180 positioned at the location of intersection of these two components. As shown in FIG. 3, locking device 180 can extend at least partially around the threaded interconnection between female thread means 182 on second nozzle body member 178 and male thread means 184 defined on first nozzle body member 176 for selective locking therebetween. In this embodiment the locking device 180 is positioned within the second nozzle body member 178 which includes the female thread means 182 operatively engageable with respect to the male thread means 184 of first nozzle body member 176. Second nozzle body member 178 includes a rim means 194 extending adjacent and around the first nozzle body member 176. A locking screw 186 extends through second nozzle body member 178 and into lower rim 194. Locking screw 186 also extends into an angular slot 190 defined in lower rim 194. A locking jaw member 188 is positioned within angular slot 190 and defines a threaded orifice therein in threaded engagement with locking screw 186. As locking screw 186 is tightened, it draws locking jaw member 188 into abutment with angular slot 190 and in wedging engagement between first nozzle body member 176 and second nozzle body member 178 thereby interlocking members 176 and 178 selectively with respect to one another. In this interlocked position the two piece nozzle body acts equivalently to a single piece integral nozzle body 112 described above with all the same characteristics of operation and adjustment set forth above. A containment screw 192 can be utilized to facilitate containment or retaining of the locking screw 186 in position extending through second nozzle body member 178 as shown. The containment screw 192 can also be used to exert force on locking screw 186 to facilitate loosening of locking jaw member 188 within angular slot 190. This locked two piece configuration for the nozzle body 112 is usable with both the automatically adjustable nozzle rod as well as the non-adjustable nozzle rod 110. The configuration shown in FIG. 3, for illustration purposes only, is shown in combination with the automatically adjustable nozzle rod.

Figure 4:
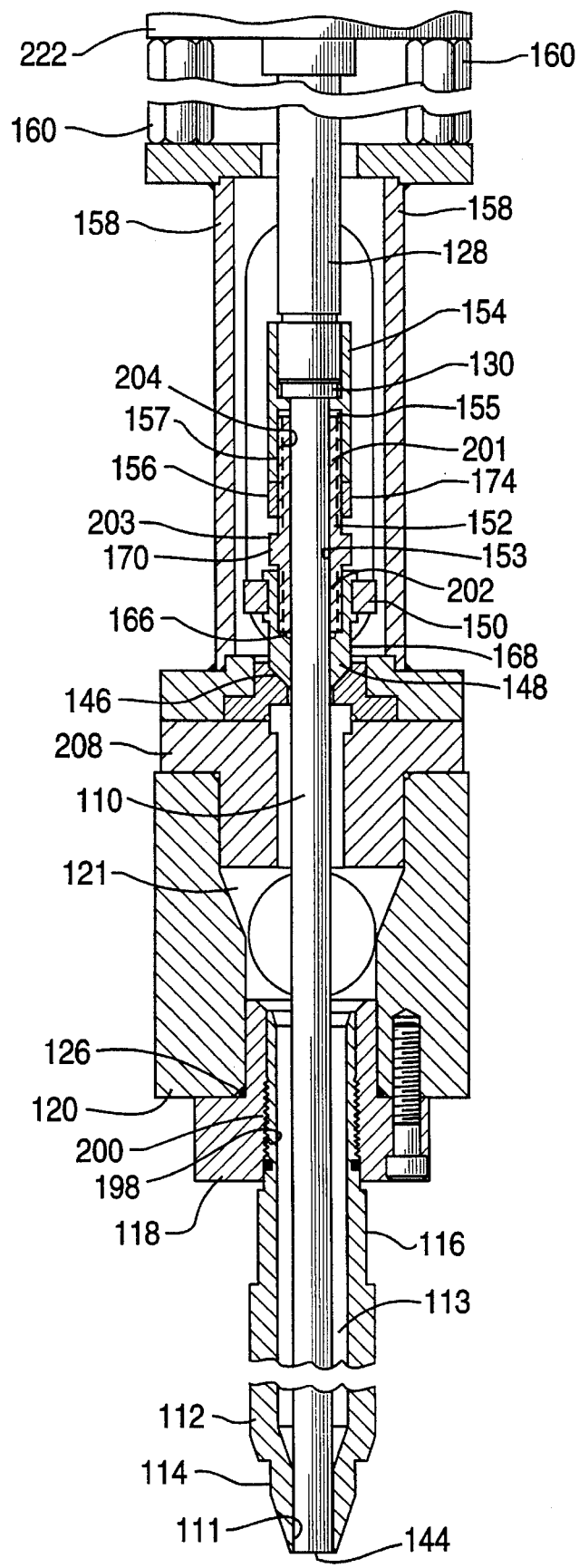
FIG. 4 is a cross-sectional view of an embodiment of a manually adjustable apparatus for controlling the length of the nozzle rod and in particular for controlling the position of the nozzle rod respective to the nozzle body.

In FIG. 4, a manual means is shown for adjusting the position of the nozzle rod 110 relative to the surrounding nozzle body 112 and the tip opening means 111 defined therein for dispensing of material therethrough directly into a mold 196. This manual adjustment means makes use of a poppet 148 which defines an opening therethrough which is slidably movable with respect to the nozzle rod 110. An extension stud member 152 includes a second stud member 202 which is threaded into engagement with a central hole defined in the poppet 148. A split shaft collar 150 extends about the poppet 148 in such a manner as to be capable of inwardly compressing the poppet 148 to grasp the second stud member 202 threaded therein and fix the threaded interconnection therebetween.

The opposite end of the extension stud member 152 also includes a stud called the first stud member 201 which includes a first stud member thread means 204 thereon adapted to extend into engagement with sleeve thread means 157 defined within sleeve bore means 155 of sleeve 154. Sleeve 154 also includes a central bore for retaining the nozzle rod 110 with respect thereto. In this manner the sleeve 154 maintains relative connection between nozzle rod 110 and poppet 148. Movement of poppet 148 into engagement with poppet seat 146 in the portion of frame 208 within the manifold 120 defines the end position of the movement stroke of the nozzle rod toward the mold 196. So this manual adjustment means is designed to vary the relative position of the nozzle rod 110 retained within sleeve 154 relative to poppet 148.

Extension stud member 152 basically includes the first stud member 201 and a second stud member 202 extending in the opposite direction. A stud shaft 203 extends between stud members 201 and 202. The extension stud means 152 defines an extension stud bore means 153 extending therethrough to allow the nozzle rod 110 to extend axially from sleeve means 154 to and past poppet 148. Sleeve means 154 defines an aperture therein for retaining of the head 130 of nozzle rod 110 therein. Sleeve means 154 also defines the sleeve bore means 155 to facilitate securement with respect to first stud member 201 of extension stud means 152. First stud member 201 preferably includes the first stud thread means 204 which is engageable with respect to sleeve thread means 157 defined within sleeve bore 155. A stud locking nut 156 is also preferably in engagement with the first stud thread means such as to be capable of tightening against said sleeve means 154.

A stanchion 158 may be attached with respect to the manifold 120 and the hydraulic cylinder 222 to extend distance therebetween for maintaining the desired spacing for retaining of this manually adjustable apparatus therebetween. The stanchion 158 can be chosen of any length as desired. Alternatively, spacers 160 may also be included positioned between stanchion 158 and hydraulic cylinder 222 to provide further spacing if needed for the manual adjustment means.

Poppet 148 may include longitudinal splits therein to facilitate inward biasing thereof by the split shaft collar 150 for fixedly grasping of the nozzle rod 110 extending therethrough. The purpose of the manual adjustment apparatus is to vary the relative position between the nozzle rod 110 and the poppet 148 as a means to achieve the ultimate goal of adjustment of positioning of nozzle rod 110 with respect to nozzle body 112. An O-ring 166 may be positioned between the extension stud member 152 and the poppet 148 the prevent leaking of plasticized fluid thereby and also past the nozzle rod 110.

The poppet 148 is threaded onto the extension stud 152 and this threaded joint will be capable of being clamped by the split shaft collar 150 which bears upon the threaded portion of the poppet 148. These splits allow the poppet 148 to collapse against the extension stud 152 under pressure from the split shaft collar 150. In this manner, the nozzle rod 110 is free to move through the poppet 148 and extension stud 152 even after the poppet 148 and extension stud 152 are clamped with respect to each other. It should be appreciated that nozzle rod 110 is completely free to move axially within the aperture defined in the poppet 148, the extension stud member 152, and the sleeve 154. The nozzle rod 110 is only retained by nozzle head 130 within sleeve 154. the sleeve 154 provides the means for axially connecting of the cylinder rod 128 with respect to the nozzle rod 110.

With this configuration, the extension stud member 152 can be screwed in or out with respect to the sleeve 154 in such a manner as to carry with it and thus change the position of the poppet 148 along the nozzle rod 110. A lock nut 156 may be capable of being tightened against the sleeve 154 after adjustment is made to maintain the setting. An external hex shape may be defined on the exterior surface of the poppet 148 referred to as hex hilt 168. In a similar manner, the extension stud member 152 can define a hex member 170 on the exterior surface thereof. Also the lock nut 156 will certainly be more useful if it includes an exterior hex surface 172 to facilitate gripping thereof. Finally, an exterior hex shape 174 may be defined on the external surface of sleeve 154 to facilitate grasping thereof by a wrench or other similar tool.

One of the ultimate goals of the apparatus described above is to be able to control the positioning of the nozzle rod 110 with respect to the nozzle body 112 and the tip opening means 111 defined therein. It should be appreciated that when poppet 148 is in the closed position in abutment within poppet seat 146, it always remains at a constant position relative to nozzle body 112. Thus by manually varying the distance from the sleeve 154, which retains the nozzle rod 110 therein, to the poppet 148, adjustment in the relative positioning of the nozzle body 112 and nozzle rod 110 is fully controllable.

In operation, the position of nozzle rod 110 is adjusted by conveniently gripping sleeve 154 with a wrench or other gripping tool and also gripping lock nut 156 similarly. These two parts are then counter-rotated in a loosening direction for unlocking therebetween to allow freedom of movement of sleeve 154 with respect to extension stud member 152. Then, the lock nut 156 is released and the wrench repositioned on the extension stud 152, preferably on the gripping surface thereof. The sleeve 154 is held fixedly and extension stud 152 is caused to rotate to achieve the desired adjustment in relative positioning therebetween. Once proper adjustment is reached the extension stud member 152 is released and lock nut 156 is re-gripped and tightened in abutment against sleeve 154 to become locked in the adjusted position relative to extension stud member 152.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An adjustable injection molding apparatus for forming of products within a mold from melted thermoplastic material comprising:

(A) a frame;

(B) a cylinder fixedly mounted with respect to said frame and defining a cylinder bore extending therethrough, said cylinder defining a first end opening and a second end opening within said cylinder bore with said first end opening and said second end opening being spatially disposed from one another;

(C) a cylinder rod means movable with respect to said cylinder and extending through said cylinder bore thereof and through said first end opening thereof and said second end opening, said cylinder rod means further comprising a bumper means thereon located outside of said cylinder bore adjacent said first end opening;

(D) a nozzle rod means attached to said cylinder rod means and extending outwardly away therefrom and being movable therewith;

(E) a nozzle body attached with respect to said frame to be adjustably secured thereto, said nozzle body defining a nozzle channel means therethrough, said nozzle body further defining a tip opening means therein in fluid flow communication with respect to said nozzle channel means, said nozzle rod means being movably mounted within said nozzle channel means for selectively allowing dispensing therethrough, said nozzle rod means being selectively positionable with respect to said tip opening means to prevent dispensing therefrom when positioned therein;

(F) a piston means fixedly secured to said cylinder rod means at a position within said cylinder bore, said piston means being reciprocally movable within said cylinder bore between a position adjacent said first end opening with said nozzle rod means opened with respect to said tip opening means and a position adjacent said second end opening with said nozzle rod means closed with respect to said tip opening means;

(G) a housing fixedly secured to said frame and defining a housing bore extending therethrough;

(H) a block movably mounted within said housing bore of said housing, said block defining an adjustment bore extending therethrough;

(I) a resilient biasing means positioned within said housing bore between said block and said housing and being operative to urge said block away from said housing;

(J) an adjustment shaft means extending through said adjustment bore and being adjustably movably secured therewithin;

(K) a first limit switch fixedly secured to said frame at a position adjacent said housing, said first limit switch being adapted to be activated to indicate movement of said nozzle rod means to a fully opened position with respect to said tip opening means;

(L) a first flag arm means attached to said block, said first flag arm means being movable with said block to a position adjacent said first limit switch;

(M) a second limit switch fixedly secured to said frame at a position adjacent said bumper means, said second limit switch being adapted to be activated to indicate movement of said nozzle rod means to the fully closed position with respect to said tip opening means;

(N) a second flag arm means attached to said cylinder rod means adjacent said bumper means to be movable therewith, said second flag arm means being movable with said cylinder rod means to a position adjacent to said second limit switch; and (O) a stop head means positioned on said adjustment shaft means and being spatially disposed from said bumper means of said cylinder rod means, said stop head being adapted to be abutted by said bumper means of said cylinder rod means responsive to movement of said nozzle rod means toward the opened position to urge said block to move toward said housing to compress said resilient biasing means and cause said first flag arm to activate said first limit switch to indicate said nozzle rod means being at the fully opened position.

2. An adjustable injection molding apparatus for forming of products within a mold from melted thermoplastic material as defined in claim 1 wherein said cylinder is integrally formed with respect to said frame.

3. An adjustable injection molding apparatus for forming of products within a mold from melted thermoplastic material as defined in claim 1 wherein said block includes block female thread means defined within said adjustment bore and wherein said adjustment shaft means defines shaft male thread means thereon being engageable with respect to said block female thread means to facilitate adjustable engagement between said adjustment shaft means and said block.

4. An adjustable injection molding apparatus for forming of products within a mold from melted thermoplastic material as defined in claim 3 wherein said adjustment shaft means includes an adjustment head means thereon spatially disposed from said stop head to facilitate adjustment in positioning of said stop head means to facilitate adjustment in spacing between said stop head means on said adjustment shaft means and said bumper means on said cylinder rod means.

5. An adjustable injection molding apparatus for forming of products within a mold from melted thermoplastic material as defined in claim 1 wherein said resilient biasing means comprises a compression spring means.

6. An adjustable injection molding apparatus for forming of products within a mold from melted thermoplastic material as defined in claim 1 further comprising a poppet means secured to said cylinder rod means and said nozzle rod means for interconnection therebetween.

7. An adjustable injection molding apparatus for forming of products within a mold from melted thermoplastic material as defined in claim 1 wherein said cylinder bore is axially aligned with respect to said first end opening and said second end opening and is positioned therebetween.

8. An adjustable injection molding apparatus for forming of products within a mold from melted thermoplastic material as defined in claim 1 wherein said housing defines an alignment slot means therein extending parallel to said adjustment shaft means extending through said block therein, and wherein said first flag arm means is affixed to said block in a position extending outwardly therefrom through said alignment slot means to maintain axial alignment between said housing and said block positioned within said housing bore.

9. An adjustable injection molding apparatus for forming of products within a mold from melted thermoplastic material comprising:

(A) a frame;

(B) a cylinder integrally formed with respect to said frame and defining a cylinder bore extending therethrough, said cylinder defining a first end opening and a second end opening within said cylinder bore with said first end opening and said second end opening being spatially disposed from one another, said cylinder bore being axially aligned with respect to said first end opening and said second end opening and positioned therebetween;

(C) a cylinder rod means movable with respect to said cylinder and extending through said cylinder bore thereof and through said first end opening thereof and said second end opening, said cylinder rod means further comprising a bumper means thereon located outside of said cylinder bore adjacent said first end opening;

(D) a nozzle rod means attached to said cylinder rod means and extending outwardly away therefrom and being movable therewith;

(E) a nozzle body attached with respect to said frame to be adjustably secured thereto, said nozzle body defining a nozzle channel means therethrough, said nozzle body further defining a tip opening means therein in fluid flow communication with respect to said nozzle channel means, said nozzle rod means being movably mounted within said nozzle channel means for selectively allowing dispensing therethrough, said nozzle rod means being selectively positionable with respect to said tip opening means to prevent dispensing therefrom when positioned therein;

(F) a piston means fixedly secured to said cylinder rod means at a position within said cylinder bore, said piston means being reciprocally movable within said cylinder bore between a position adjacent said first end opening with said nozzle rod means opened with respect to said tip opening means and a position adjacent said second end opening with said nozzle rod means closed with respect to said tip opening means, said piston means being larger than said first end opening and larger than said second end opening to facilitate retainment of said piston means within said cylinder bore during reciprocating movement thereof;

(G) a housing fixedly secured to said frame and defining a housing bore extending therethrough, said housing including housing female thread means defined within said housing bore, said housing defining an alignment slot means therein extending parallel to said cylinder rod means;

(H) a block movably mounted within said housing bore of said housing adjacent said alignment slot means, said block defining an adjustment bore extending therethrough;

(I) a resilient biasing means comprising a resilient spring means positioned within said housing bore between said block and said housing and being operative to urge said block away from said housing;

(J) an adjustment shaft means extending through said adjustment bore and being adjustably movably secured therewithin, said adjustment shaft means including shaft male thread means thereon positioned in engagement with respect to said block female thread means to facilitate adjustable engagement between said adjustment shaft means and said block, said adjustment shaft means including an adjustment head means thereon to facilitate gripping thereof and to facilitate adjustment in positioning of said adjustment shaft means with respect to said block and to facilitate adjustment in spacing between said adjustment shaft means and said bumper means on said cylinder rod means;

(K) a first limit switch fixedly secured to said frame at a position adjacent said housing, said first limit switch being adapted to be activated to indicate movement of said nozzle rod means to a fully opened position with respect to said tip opening means;

(L) a first flag arm means secured to said block to be movable therewith and extending outwardly therefrom through said alignment slot means in order to maintain axial alignment between said housing and said block, said first flag arm means being movable with said block to a position adjacent said first limit switch for activating thereof responsive to movement of said nozzle rod means to the fully opened position relative to said tip opening means;

(M) a second limit switch fixedly secured to said frame at a position adjacent said bumper means, said second limit switch being adapted to be activated to indicate movement of said nozzle rod means to the fully closed position with respect to said tip opening means;

(N) a second flag arm means attached to said cylinder rod means adjacent said bumper means to be movable therewith, said second flag arm means being movable with said cylinder rod means to a position adjacent to said second limit switch for activating thereof responsive to movement of said nozzle rod means to the fully closed position relative to said tip opening means;

(O) a stop head means positioned on said adjustment shaft means oppositely from said adjustment head and being spatially disposed from said bumper means of said cylinder rod means, said stop head being adapted to be abutted by said bumper means of said cylinder rod means responsive to movement of said nozzle rod means toward the opened position to urge said block to move toward said housing to compress said resilient biasing means and cause said first flag arm to activate said first limit switch to indicate said nozzle rod means being at the fully opened position; and (P) a manifold means fixedly secured to said frame and defining a manifold channel means extending therethrough, said manifold defining a poppet seat means therearound within said manifold channel means; and (Q) a poppet means attached with respect to said cylinder rod means and said nozzle rod means for interconnection therebetween, said poppet means being selectively movable during an injection stroke with said cylinder rod means and said nozzle rod means to be engageable with respect to said poppet seat means responsive to said nozzle rod means being positioned extending into said tip opening to prevent material flow therethrough.

10. An adjustable injection molding apparatus for forming of products within a mold from melted thermoplastic material comprising:

(A) a frame;

(B) a cylinder fixedly mounted with respect to said frame and defining a cylinder bore extending therethrough, said cylinder defining a first end means and a second end means within said cylinder bore spatially disposed from one another;

(C) a cylinder rod means movable with respect to said cylinder and extending into said cylinder bore thereof;

(D) a nozzle rod means attached to said cylinder rod means and extending outwardly away therefrom and being movable therewith;

(E) a nozzle body attached with respect to said frame to be adjustable secured thereto, said nozzle body defining a nozzle channel means therethrough, said nozzle body further defining a tip opening means therein in fluid flow communication with respect to said nozzle channel means, said nozzle rod means being movably mounted within said nozzle channel means for selectively allowing dispensing therethrough, said nozzle rod means being selectively positionable with respect to said tip opening means to prevent dispensing therefrom when positioned therein;

(F) a piston means fixedly secured to said cylinder rod means at a position within said cylinder bore, said piston means being reciprocally movable within said cylinder bore between a position adjacent said first end means with said nozzle rod means opened with respect to said tip opening means and a position adjacent said second end means with said nozzle rod means closed with respect to said tip opening means;

(G) a manifold means fixedly secured to said frame and defining a manifold channel means extending therethrough; and (H) a nozzle flange means secured to said manifold means and defining a flange channel means therein in fluid flow communication with respect to said manifold channel means to receive melted thermoplastic material therefrom for movement therethrough, said nozzle body being attached with respect to said frame by being movably adjustably secured with respect to said nozzle flange means with said nozzle channel means positioning in fluid flow communication with respect to said flange channel means to facilitate receiving of melted thermoplastic material therefrom, said nozzle body being adjustably movable with respect to said manifold means to facilitate adjustment in positioning between said nozzle body and said frame.

11. An adjustable injection molding apparatus for forming of products within a mold from melted thermoplastic material as defined in claim 10 wherein said nozzle body includes nozzle body thread means thereon and wherein said flange channel means includes a flange thread means therewithin being movably engageable with respect to said nozzle body thread means to facilitate adjustable movement of said nozzle body with respect thereto, said nozzle body including a nozzle body flat means thereon to facilitate gripping of said nozzle body for adjustment thereof.

12. An adjustable injection molding apparatus for forming of products within a mold from melted thermoplastic material as defined in claim 11 further including a first sealing means positioned between said nozzle body and said nozzle flange means to prevent leakage therebetween and further including a second sealing means positioned between said nozzle flange means and said manifold means to prevent leakage therebetween.

13. An adjustable injection molding apparatus for forming of products within a mold from melted thermoplastic material as defined in claim 11 wherein said nozzle body includes:
    (A) a first nozzle body member adjustably secured to said nozzle flange means and extending outwardly therefrom;
    (B) a second nozzle body member detachably affixed to said first nozzle body member and extending further outwardly from said nozzle flange means; and
    (C) a locking means secured to said first nozzle body member and said second nozzle body member for detachably affixing therebetween.

14. An adjustable injection molding apparatus for forming of products within a mold from melted thermoplastic material as defined in claim 13 wherein said second nozzle body member includes a overlapping rim means extending around said first nozzle body member, said overlapping rim means defining an angular slot means therein, said locking means further comprising:
    (D) a locking jaw means movably positioned within said angular slot means and in abutment with respect to said first nozzle body member;
    (E) a locking screw means extending through said overlapping rim means of said second nozzle body member into said angular slot means and in engagement with respect to said locking jaw means to urge movement thereof within said angular slot means responsive to rotation of said locking screw means to selectively secure said first nozzle body member to said second nozzle body member and prevent relative movement therebetween.

15. An adjustable injection molding apparatus for forming of products within a mold from melted thermoplastic material as defined in claim 14 wherein said locking means further includes a containment screw extending into said second nozzle body member adjacent said locking screw means for retaining of said locking screw means in position extending into said second nozzle body member and into said angular slot means thereof, said containment screw being in abutment with said locking screw means for pushing thereof into said second nozzle body member.

16. An adjustable injection molding apparatus for forming of products within a mold from melted thermoplastic material as defined in claim 10 wherein said nozzle rod means further comprises:
    (A) a first nozzle rod member extending through said nozzle channel means to an intermediate position therein;
    (B) a second nozzle rod member rotatably secured to said first nozzle rod member and extending therefrom along said nozzle channel means to a position adjacent said tip opening means for selectively closing thereof, said second nozzle rod member being longitudinally adjustably movable with respect to said first nozzle rod member responsive to rotational movement thereof with respect to said first nozzle rod member, said second nozzle rod member defining a keyway means extending longitudinally therealong; and
    (C) a key means extending through said nozzle body into said nozzle channel means adjacent said second nozzle rod member into engagement within said keyway means, said key means being operative to cause rotational movement of said second nozzle rod member with respect to said first rod member responsive to rotational movement of said nozzle body with respect to said nozzle flange means to maintain relative adjustment positioning between said second nozzle rod member and said tip opening means.

17. An adjustable injection molding apparatus for forming of products within a mold from melted thermoplastic material as defined in claim 10 further comprising a poppet seat means fixedly attached to said manifold means and a poppet means adjustably attached with respect to said nozzle rod means and movable therewith respect to said poppet seat means for selective abutment therewith responsive to movement of said nozzle rod means to a position within said tip opening means to prevent dispensing of material therethrough.

18. An adjustable injection molding apparatus for forming of products within a mold from melted thermoplastic material as defined in claim 17 further comprising a manual adjustment means comprising:
    (A) a sleeve means secured to said cylinder rod means and having said nozzle rod means attached thereto for linking of said cylinder rod means with respect to said nozzle rod means, said sleeve means defining a sleeve bore means extending therein;
    (B) an extension stud means defining an extension stud bore means extending therethrough adapted to receive said nozzle rod means movably positioned extending therethrough, said extension stud means including:
        (1) a first stud member extending into said sleeve bore means of said sleeve means and movably adjustably secured therewithin;
        (2) a stud shaft means fixedly formed with said first stud member;
        (3) a second stud member extending outwardly from said stud shaft means oppositely from said first stud member and being secured to said poppet means;
    (C) a split shaft collar means positioned extending around said poppet means and said second stud member, said split shaft collar means adapted to compress said poppet means around said second stud member for fixed attachment therebetween; and (D) a stud locking means positioned around said first stud member and being movable into abutment with respect to said sleeve means to facilitate adjustable securement of said extension stud means with respect to said sleeve means.

19. An adjustable injection molding apparatus for forming of products within a mold from melted thermoplastic material as defined in claim 18 wherein said sleeve bore means includes a sleeve thread means therein and wherein said first stud member includes a first stud member thread means thereon engageable with said sleeve thread means to facilitate adjustable positioning therebetween responsive to relative rotation of said first stud member with respect to said sleeve means, and wherein said stud locking means comprises a stud locking nut positioned extending around said first stud member in engagement with said first stud member thread means thereon and being adjacent said sleeve means to facilitate locking engagement therewith to selectively affix said first stud member with respect to said sleeve means after securing proper adjustment therebetween.

* * * * *

UNITED STATES PATENT AND TRADEMARK OFFICE
CERTIFICATE OF CORRECTION

PATENT NO. : 5,531,581
DATED : July 2, 1996
INVENTOR(S) : Emerson B. Donnell, Jr.

It is certified that error appears in the above-identified patent and that said Letters Patent is hereby corrected as shown below:

On title page, item [54] and col. 1, line 1,
    in the title, change "AJUSTABLE" to --ADJUSTABLE--.

Signed and Sealed this

Seventeenth Day of September, 1996

Attest:

BRUCE LEHMAN

Attesting Officer     Commissioner of Patents and Trademarks